_United States Patent Office_

3,283,017
Patented Nov. 1, 1966

3,283,017
VAPOR PHASE CONDENSATION PROCESS
AND PRODUCT
Edward D. Weil, Lewiston, N.Y., assignor to Hooker
Chemical Corporation, Niagara Falls, N.Y., a corporation of New York
No Drawing. Filed Dec. 14, 1962, Ser. No. 244,563
14 Claims. (Cl. 260—650)

This invention relates to a novel vapor phase process for the preparation of substituted perhalogenated unstaurated carbocyclic compositions and to new compositions of matter. More specifically, the invention resides in a novel vapor phase process for the preparation of aryl and arylalkyl substituted heptahalocyclopentenes, arylpentahalocyclopentadienes, and (arylalkyl) pentahalocyclopentadienes.

The perhalogenated unsaturated carbocyclic compositions are useful as chemical intermediates, biotoxicants and dielectrics. Further, the pentahalocyclopentadienyl substituted aromatic hydrocarbons, in their role as chemical intermediates, may be additively halogenated to heptahalocyclopentenyl substituted aromatic hydrocarbons, which themselves show substantial herbicidal and pesticidal activity. The latter compounds may be converted by hydrolysis to arylpentahalocyclopentenones and these ketones may be cleaved to form aryl-substituted tetrahalopentadienoic acids which are effective herbicides. Also, the compositions containing fluorine are thermally stable liquids which may be utilized as high temperature lubricants.

A method of preparation for some compositions which may also be made according to the instant invention is known from U.S. Patent 2,894,994. This patent is concerned with a liquid phase operation and involves the substitution of the pentachlorocyclopentadienyl radical onto the side chain portion of alkylaromatic in the presence of a rather expensive free radical catalyst, such as acetyl peroxide. Further, this process often requires the use of expensive pressure equipment. In using high pressure equipment, the process of manufacture in turn may also become costly. Also, compositions having a pentachlorocyclopentadienyl group directly attached to an aromatic ring are not produced by the process of the patent.

It is an object of this invention to provide an economical and convenient process for the preparation of substituted perhalogenated unsaturated carbocyclic compositions.

Another object of the instant invent is to provide a process for the preparation of substituted perhalogenated unsaturated carbocyclic compositions which does not require the utilization of a chemical initiator.

A still further object of this invention is the provision of a process which is simple to accomplish, which will utilize little space in a commercial setup, which can be conducted in a short period of time, and which can be conducted at atmospheric pressures.

Still another object of this invention is the provision of a process for the preparation of valuable by-products.

A yet still further object is to provide a process for the preparation of substituted perhalogenated unsaturated carbocyclic compositions which is suitable for adaption to a continuous process.

Other objects of this invention will become apparent to one skilled in the art upon a further reading of this disclosure.

In one aspect, the novel process of this invention is concerned with the preparation of an aromatic hydrocarbon substituted by at least one perhalogenated unsaturated carbocyclic radical. This is accomplished by contacting in the vapor phase a perhalogenated unsaturated carbocyclic compound containing at least one chlorine substituent on the ring with an aromatic hydrocarbon and recovering the desired products. Of the perhalogenated unsaturated carbocyclic compounds utilizable in the process of this invention, those which are preferred contain at least 5 carbon atoms.

In another aspect, the novel process of the instant invention involves the preparation of an aromatic hydrocarbon substituted by at least one pentahalocyclopentadienyl radical. This is accomplished by contacting in the vapor phase hexahalocyclopentadiene with an aromatic hydrocarbon and recovering the desired products.

The preparation of the arylpentachlorocyclopentadiene compounds is illustrated by the following general equation:

$$nC_5Y_6 + \text{aromatic hydrocarbon} \rightarrow (C_5Y_5)_n \text{ aryl} + nHY$$

wherein Y is a halogen, preferably chlorine or bromine, the aromatic hydrocarbon is free of a hydrogen-bearing alkyl side chain, $C_5Y_5$ is the pentahalocyclopentadienyl group, $n$ is an integer from one to two inclusive, and aryl is an aromatic hydrocarbon radical possessing at its point of attachment a ring carbon atom.

The preparation of the (arylalkyl) pentahalocyclopentadiene compounds is illustrated by the following general equation:

$$nC_5Y_6 + (C_xH_{2x+1}) - \text{Aryl} \rightarrow (C_5Y_5)_n(C_xH_{2x+1-n}) - \text{Aryl}$$

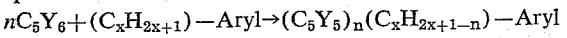

wherein the aromatic hydrocarbon possesses at least one hydrogen-bearing alkyl side chain of from 1 to 6 carbon atoms, $x$ is the number of carbon atoms in the alkyl group originally present on the aromatic ring and the other terms are as herein described.

In accordance with the instant invention, a perhalogenated unsaturated carbocyclic radical, preferably hexahalocyclopentadiene is contacted with an aromatic hydrocarbon, i.e., one that is free of a hydrogen-bearing alkyl side chain or one that possesses at least one hydrogen-bearing alkyl side chain, in the vapor phase at a temperature from between about 350 degrees centigrade to about 650 degrees centigrade. When the aromatic hydrocarbon is free of a hydrogen-bearing alkyl side chain, the perhalogenated unsaturated carbocyclic radical is introduced directly into the aromatic ring. This aromatic hydrocarbon may possess thermally stable substituents such as halogen, aryl, aryloxy, trihalomethyl, and perhalovinyl. Illustrative examples of such aromatic hydrocarbons include benzene, biphenyl, naphthalene, anthracene, halogenated benzenes, dihalogenated benzenes, trihalogenated benzenes, dibenzofurans, and benzotrihalides.

Where the aromatic hydrocarbon possesses at least one hydrogen-bearing alkyl side chain, preferably of about 1 to 6 carbon atoms, the substitution of the perhalogenated unsaturated carbocyclic radical occurs primarily on said alkyl side chain, in preference to the ring. Illustrative examples of such hydrocarbons include toluene, ethylbenzene, diethylbenzene, cumene, cymene, xylene, pseudocumene, durene, diisopropylbenzene, p-chlorotoluene, o-chlorotoluene, 3,4-dichlorotoluene, diphenylmethane, di-p-chlorophenylmethane and sec-butylbenzene.

Illustrative examples of compositions which may be prepared by the process of the instant invention include

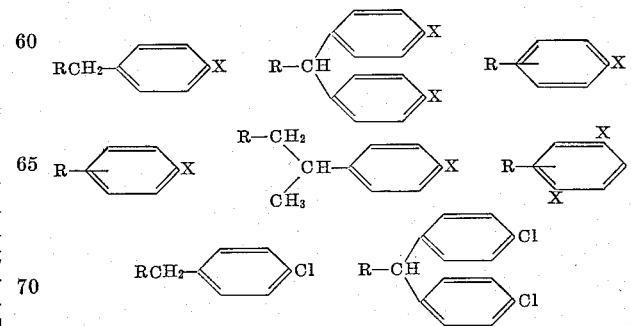

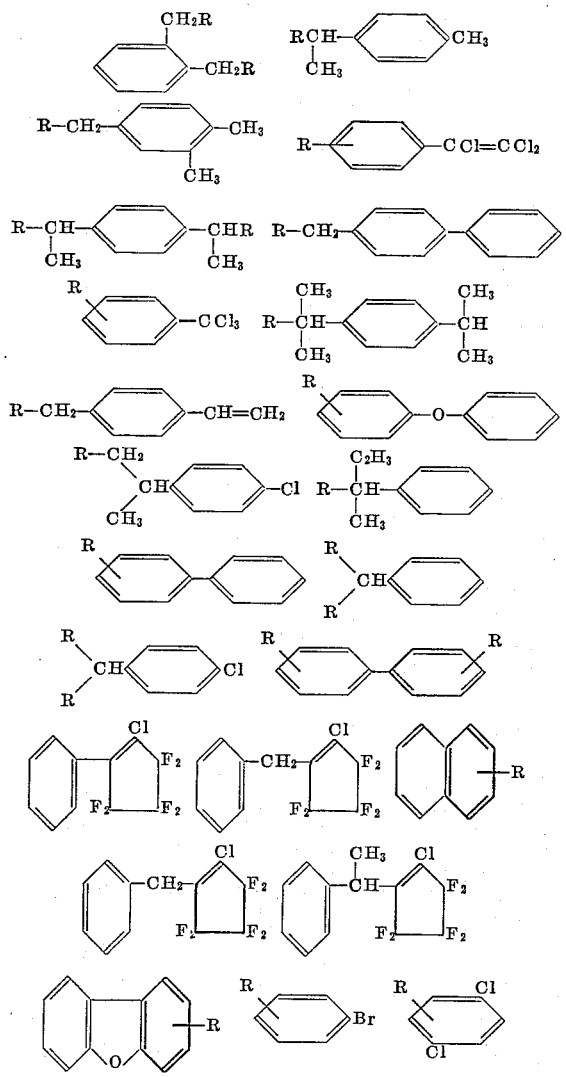

wherein R represents

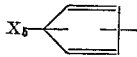

and X is a halogen preferably chlorine or bromine.

A preferred embodiment of the instant invention comprises contacting and reacting in the vapor phase hexachlorocyclopentadiene with an aromatic hydrocarbon, i.e., one that is free of a hydrogen-bearing alkyl side chain such as benzene. The thus resulted products are represented best by the formula:

wherein $n$ is an integer from one to two inclusive.

Another preferred embodiment comprises contacting in the vapor phase a hexachlorocyclopentadiene with an aromatic hydrocarbon possessing a hydrogen-bearing alkyl side chain of preferably one to six carbon atoms, such as toluene. The products resulting are represented by the following general formula:

$$(C_5Cl_5)_n(C_xH_{2x+1-n})Aryl$$

wherein $n$, $x$, and aryl are as defined herein.

The condensation of a perhalogenated unsaturated carbocyclic compound with an aromatic hydrocarbon is illustrated by the following equations showing the condensation of one molecular proportion of benzene with one molecular proportion of 1,2-dichlorohexafluorocyclopentene in the vapor phase and the evolution of one molecular proportion of hydrogen chloride, and also the condensation of one molecular proportion of toluene with one molecular proportion of 1,2-dichlorohexafluorocyclopentene in the vapor phase and the evolution of one molecular proportion of hydrogen chloride. It is to be noted that hydrogen fluoride is not evolved in these reactions, due to the greater stability of the carbon-fluorine bond compared to that of the carbon-chlorine bond.

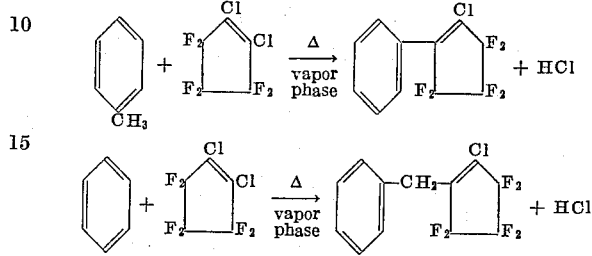

Illustrative examples of perhalogenated unsaturated carbocyclic compounds utilizable include 1-chloroheptafluorocyclopentene,
1,2-dichlorohexafluorocyclopentene,
5,5-dibromo-1,2,3,4-tetrachlorocyclopentadiene,
octachlorocyclopentene,
1,2-dichlorohexafluorocyclopentene,
hexachlorocyclopentadiene,
hexabromocyclopentadiene.

The new compositions of matter which can be prepared by the process of the instant invention can best be represented by the following general formula:

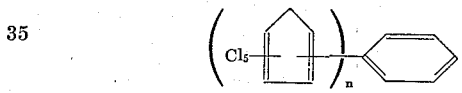

wherein $n$ is an integer from one to two inclusive.

The two reactants, pure or admixed with an inert carrier gas such as nitrogen or carbon dioxide are fed into a heated reactor. If desired, either or both reactants may first be vaporized in a preheater-vaporizer, the temperature of which is not critical, or the reactants may be fed separately or admixed as liquids directly into the heated reactor, employing the area of the reactor near the inlet as a preheating and vaporizing zone. In any case, the part of the reactor in which the reaction itself is to take place will receive the reactants in the vapor state.

While the geometry, shape, configuration, or design of the reactor is not critical, because of heat transfer advantages, tubular designs are preferred. Further, this type of preferred design also results in producing maximum uniformity of retention time of the reactants. The reaction is usually carried out in unpacked or packed tubes constructed from a variety of materials. Appropriate packing materials are those which facilitate heat transfer and are inert and heat resistant. They include inert metals and the like. Suitable construction materials are those which combine thermal stability with resistance to hydrogen halides and haloorganics at the reaction temperatures. These include among others various corrosion resistant alloys, base metals plated with a protective noble metal coating, as well as the noble metals themselves. Illustrative examples include ceramics, glass, graphite, nickel and certain steels.

The reaction is operable at 300 degrees to 650 degrees centigrade, a preferred temperature range being from between about 350 degrees to 500 degrees centigrade. Temperatures below 300 degrees centigrade are often unfavorable in reaction time and yield, while temperatures above 650 degrees centigrade not only require special and more expensive equipment, but undersirable carbonization occurs, too.

The process may be operated conveniently at or near atmospheric pressure, although lower and higher pressures may be utilized without departing from the scope of the invention.

The reactant ratio employed may be varied. Equimolar quantities may be used, but where monosubstitution is to be enhanced, an excess of aromatic hydrocarbon is advisable; where disubstitution is to be enhanced, an excess of hexahalocyclopentadiene is advisable. The excess reactant and in general any unreacted starting materials may be distilled out of the product and recycled, either continuously or batchwise.

Retention times may vary considerably, for example, between a fraction of a second up to several minutes, but up to 50 seconds is a preferred range.

The separation of the organic portion of the reactor effluent from the hydrogen halide is conveniently performed by passing the total effluent through material or apparatus capable of condensing the organic material such as water or brine-cooled condenser, and leaving the hydrogen chloride uncondensed, or by passing the effluent through a water scrubbing vessel or tower to dissolve out the hydrogen halide, leaving the organic material as an acid-free condensate. The organic product is separated by the usual means, such as distillation, into recovered starting materials, and products. The hydrogen halide, either anhydrous or aqueous, is a valuable by-product of the process.

When the products resulting from the process of the invention are isomer mixtures they may frequently be employed as such for pesticidal purposes and as chemical intermediates, or may be resolved by crystallization, fractional distillation, chromatographic separation, or other suitable means into isomers.

To further make clear our invention, the following examples, not intended to be limiting are given.

Example 1

A liquid mixture of benzene and hexachlorocyclopentadiene at the ratio of 1:1 by volume is fed continuously at the rate of 400 milliliters per hour by means of a mechanical pump, into a Pyrex tube of 125 cc. internal volume, heated by an electric furnace to 368 degrees (near inlet) and 420 degrees centigrade (near outlet). The feed vaporizes completely immediately upon entering the heated zone. The effluent vapors pass into a water-jacketed receiver which acts as a condenser for the organic materials in the effluent. The uncondensed effluent hydrogen chloride leaves the water-jacketed receiver and is collected in a water-filled trap. By Volhard titration, it is found that 0.6 moles of hydrogen chloride per hour are collected.

The receiver contents are distilled through a fractionating column to remove fractions as follows:

| Wt. Grams | Boiling Range, degrees | Pressure | Identification | Method of Identification |
|---|---|---|---|---|
| 170 | 75–88 | 1 atm | Mostly benzene | Sp. gravity. |
| 30 | 60–80 | 0.15–0.20 mm. | Hexachlorocyclopentadiene. | Infrared. |
| 23 | 108.5–114.5 | 0.15 mm. | Pentachlorocyclopentadienylbenzene. | See analysis below. |
| 6 | 222–223 | 0.3–0.4 mm. | Bis(pentachlorocyclopentadienyl) benzene. | See analysis below. |
| 12 | Undistillable semi-solid, containing tris- and higher pentachlorocyclopentadienyl benzenes | | | |

Pentachlorocyclopentadienyl benzene is a viscous yellowish syrup $N^D 25$ 1.6119.

*Analysis.*—Calculated for $C_{11}H_5Cl_5$: C, 42.0; H, 1.6; Cl, 56.5. Found: C, 41.6; H, 1.8; Cl, 57.0.

Bis(pentachlorocyclopentadienyl) benzene is a light yellow waxy solid.

*Analysis.*—Calculated for $C_{16}H_4Cl_{10}$: C, 34.9; H, 0.7; Cl, 64.5. Found: C, 34.2; H, 0.9; Cl, 65.0.

The infrared spectrum of both products showed bands in the 6.0 to 6.5 micron region characteristic of the perchloropentadiene structure and of an aromatic ring.

Example 2

A run at 410–455 degrees similar to the above, but utilizing chlorobenzene in place of benzene as the aromatic reactant, yielded, in addition to hydrogen chloride and recovered hexachlorocyclopentadiene and chlorobenzene, a yellowish wax, which distilled as a viscous liquid at 132–135.5 degrees centigrade (0.1 mm. mercury), and which was established by chlorine analysis and infrared spectrum to be chloro(pentachlorocyclopentadienyl)benzene.

These compounds exhibited antimicrobial activity of diverse sorts. Pentachlorocyclopentadienylbenzene, at a concentration of 0.025 percent in nutrient agar substantially prevented the growth of *Staphylococcus aureus*. When applied (in aqueous 0.04 percent dispersion) to the foliage of tomato plants inoculated with spores of *Alternaria solani*, both pentachlorocyclopentadienylbenzene and bis(pentachlorocyclopentadienyl) benzene substantially prevented the symptoms of early blight disease from developing. Bis(pentachlorocyclopentadienyl) benzene, admixed at 50 parts per million with soil heavily infested with damping-off organisms of *Pythium* species, permitted the healthy emergence of pea seedlings planted therein.

Microorganisms which can be treated in a similar manner by perhalogenated unsaturated carbocyclic compositions include fungi, bacteria, protozoa and helminths.

Example 3

Into a tubular reactor heated by an electric furnace at 420–442 degress centigrade, is fed a mixture of toluene and hexachlorocyclopentadiene in a 1.5 molar ratio, at the rate of 170 milliliters of liquid feed per hour.

In 7.1 hours, 3.76 moles of hexachlorocyclopentadiene and 5.68 moles of toluene are fed. The receiver, cooled by water, contains 1,550 grams of liquid product, and a total of 0.619 mole of hydrogen chloride is found in the water traps and in a lesser amount, dissolved in the liquid product.

Unreacted toluene is recovered by stripping the liquid product to a pot temperature of 113 degrees at 27 mm. Then, the unreacted hexachlorocyclopentadiene is removed at 73–90 degrees (0.15 mm.), and then 73 grams of benzylpentachlorocyclopentadiene, B.P. 108.5–110 degrees (0.25 mm.) is collected as a yellowish liquid which sets to a light yellow solid. On recrystallization from methanol, colorless crystals, melting point of 56–57 degress centigrade are obtained.

*Analysis.*—Calculated for $C_{12}H_7Cl_5$: Cl, 54.0. Found: Cl, 54.4.

Various changes and modifications may be made in the methods and compositions of this invention, certain preferred forms of which have been herein described, without departing from the spirit and scope of this invention.

I claim:

1. A process for the preparation of an aromatic compound substituted by at least one perhalogenated unsaturated carbocyclic radical which comprises reacting in the vapor phase at a temperature between about 300 degrees and 650 degrees centigrade a perhalogenated cyclopentadiene, wherein the halogen is selected from the group consisting of chlorine and bromine containing at least one chlorine substituent, with an aromatic compound selected from the group consisting of benzene and benzene substituted by a substituent selected from the group consisting of chlorine, bromine, phenyl, phenoxy, trihalomethyl, perhalovinyl, wherein the halogen is selected from the group consisting of chlorine and bromine, and alkyl of about 1 to 6 carbon atoms, and recovering the desired product.

2. A process according to claim 1 wherein the aromatic compound reactant is selected from the group consisting of benzene and benzene substituted by a substituent selected from the group consisting of chlorine, bromine, phenyl, phenoxy, trihalomethyl and perhalovinyl, wherein the halogen is selected from the group consisting of chlorine and bromine.

3. A process according to claim 1 wherein the aromatic compound reactant is benzene substituted by an alkyl of 1 to 6 carbon atoms.

4. A process according to claim 1 in which reactor effluent is separated into an organic portion and hydrogen halide by cooling the effluent to a temperature below the condensation temperature of the organic component thereof.

5. A process for the preparation of an aromatic hydrocarbon substituted by at least one pentaholocyclopentadienyl radical which comprises reacting in the vapor phase, at a temperature from about 300 degrees centigrade to about 650 degrees centigrade, a hexahalocyclopentadiene selected from the group consisting of hexachlorocyclopentadiene and hexabromocyclopentadiene, with toluene and separating the organic portion of the reactor effluent from the hydrogen halide produced, by cooling the reactor effluent to below the condensation temperature of the organic component.

6. A process according to claim 5 wherein the hexahalocyclopentadiene employed is hexachlorocyclopentadiene.

7. A process for the preparation of an aromatic hydrocarbon substituted by at least 1 pentahalocyclopentadienyl radical which comprises reacting, in the vapor phase, at a temperature between about 300 degrees and 650 degrees centigrade, a hexahalocyclopentadiene selected from the group consisting of hexachlorocyclopentadiene and hexabromocyclopentadiene, with benzene and recovering the desired products.

8. A process for the preparation of an aromatic hydrocarbon substituted by at least 1 pentahalocyclopentadienyl radical which comprises reacting, in the vapor phase, at a temperature between about 300 degrees and 650 degrees centigrade, a hexahalocyclopentadiene selected from the group consisting of hexachlorocyclopentadiene and hexabromocyclopentadiene, with toluene.

9. A process for the preparation of aromatic hydrocarbons substituted by at least one pentahalocyclopentadienyl radical which comprises reacting, in the vapor phase, at a temperature from between about 300 degrees and 650 degrees centigrade hexachlorocyclopentadiene with benzene and separating the organic portion of the reactor effluent from the hydrogen chloride produced by cooling the reactor effluent to below the condensation temperature of the organic component.

10. Compositions of the following general formula:

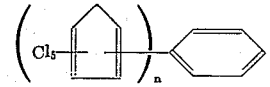

wherein $n$ is an integer from one to two inclusive.

11. Pentachlorocyclopentadienylbenzene.
12. Bis(pentachlorocyclopentadienyl)benzene.
13. Compositions of the following general formula:

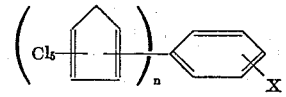

wherein X is a halogen selected from the group consisting of chlorine and bromine and $n$ is an integer from one to two, inclusive.

14.

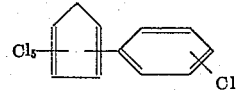

References Cited by the Examiner
UNITED STATES PATENTS

| | | | |
|---|---|---|---|
| 2,552,607 | 5/1951 | Warner | 260—649 |
| 2,600,691 | 6/1952 | Ross et al. | 260—649 |
| 2,894,994 | 7/1959 | Schmerling | 260—650 |
| 2,935,439 | 5/1960 | Wright et al. | 167—30 |
| 2,967,125 | 1/1961 | Carlson | 167—30 |
| 2,967,842 | 1/1961 | Roberts | 260—649 X |

LEON ZITVER, *Primary Examiner.*

JULIAN S. LEVITT, *Examiner.*

R. HUFF, K. H. JOHNSON, K. V. ROCKEY,
*Assistant Examiners.*